United States Patent [19]

Parker

[11] 4,023,425
[45] May 17, 1977

[54] CENTRIFUGAL FLUID EXPANSIBLE PULLEY WITH MANIFOLD VACUUM CONTROL MEANS

[75] Inventor: Robert Henry Parker, Esher, England

[73] Assignee: A. C. Cars Limited, England

[22] Filed: Apr. 21, 1976

[21] Appl. No.: 678,768

[52] U.S. Cl. .................. 74/230.17 E; 74/230.17 F
[51] Int. Cl. ...................... F16h 55/52; F16h 55/56
[58] Field of Search ............. 74/230.17 E, 230.17 F

[56] References Cited

UNITED STATES PATENTS

| 2,779,203 | 1/1957 | Eubanks | 74/230.17 F |
|---|---|---|---|
| 2,802,367 | 8/1957 | Hoover et al. | 74/230.17 F |
| 3,017,783 | 1/1962 | Brugghen et al. | 74/230.17 E |
| 3,081,642 | 3/1963 | Emerson | 74/230.17 F |
| 3,195,368 | 7/1965 | Boudewijn | 74/230.17 F |
| 3,478,611 | 11/1969 | Venne et al. | 74/230.17 E |
| 3,653,283 | 4/1972 | Betz | 74/230.17 F |
| 3,715,930 | 2/1973 | Beliveau et al. | 74/230.17 F |
| 3,893,343 | 7/1975 | Zaiser et al. | 74/230.17 F |
| 3,906,808 | 9/1975 | Zaiser et al. | 74/230.17 F |

Primary Examiner—Samuel Scott
Assistant Examiner—Allan R. Burke
Attorney, Agent, or Firm—Hauke & Patalidis

[57] ABSTRACT

A pulley in which one flange, slidably mounted on a driving shaft, is movable towards another flange, fixed to the shaft, in response to the centrifugal force created by rotation of the shaft, acting on a quantity of oil contained in an annular chamber which is defined by the movable flange and a back-plate fixed to the driving shaft and is permanently connected to either the ambient atmosphere or a source of oil through a breather passage.

6 Claims, 2 Drawing Figures

CENTRIFUGAL FLUID EXPANSIBLE PULLEY WITH MANIFOLD VACUUM CONTROL MEANS

This invention relates to pulleys of the kind in which one flange is slidably mounted on a driving shaft for movement towards a fixed flange on the driving shaft, in response to centrifugal force created by rotation of the shaft.

The invention is particularly, though not exclusively, concerned with pulleys which have their principal application in variable speed transmissions in which an increase in the effective diameter of the pulley causes an increase in the speed of the belt relative to that of the shaft.

According to the present invention, a pulley of the kind described is provided with a back plate fixed to the shaft and defining, with the movable flange, an annular chamber permanently connected to either the ambient atmospheres or an external source of oil through a breather passage and containing a quantity of oil which acts on said movable flange in response to the centrifugal force created by rotation of the shaft, to shift the movable flange towards the fixed flange.

Figure 1:
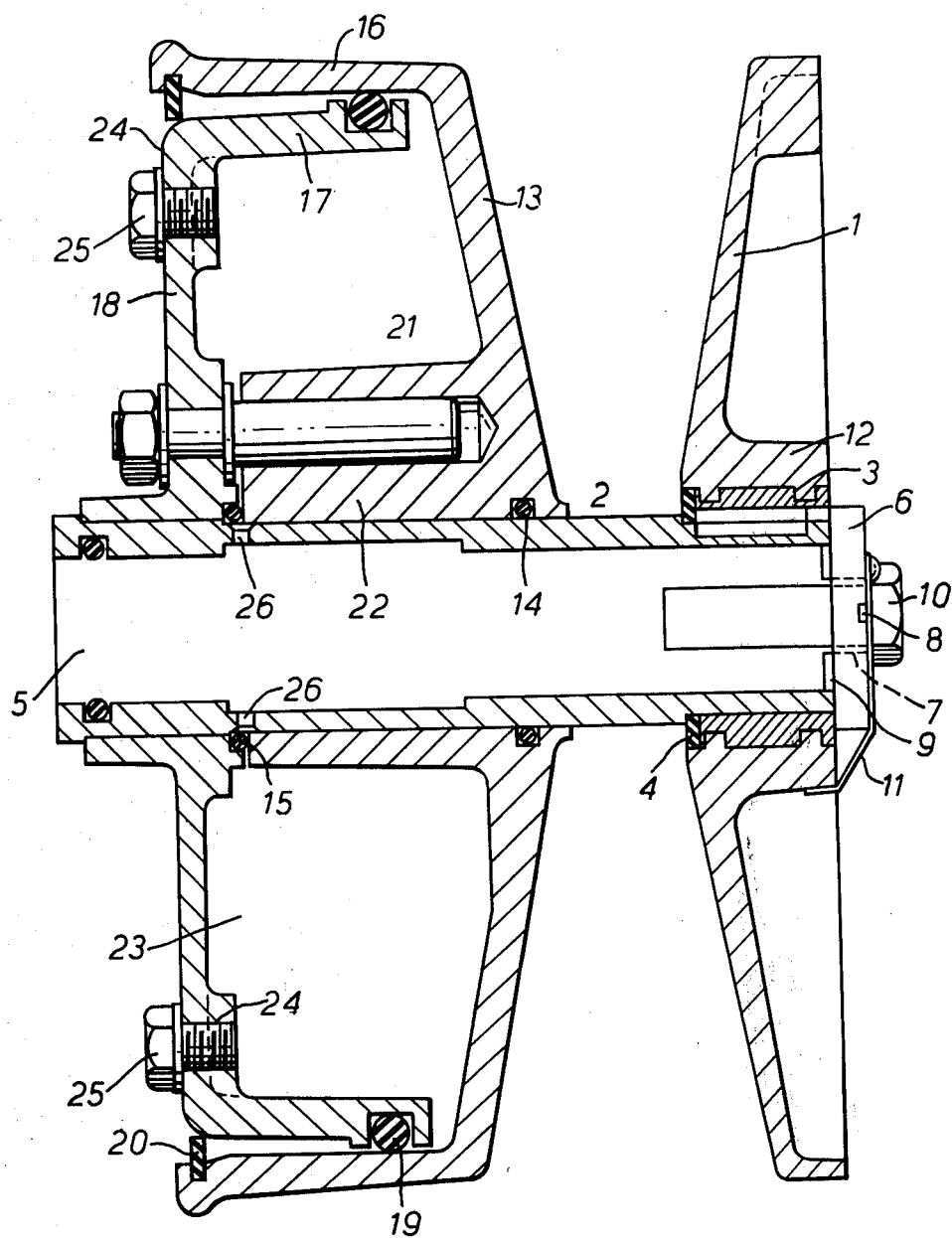
Figure 2:
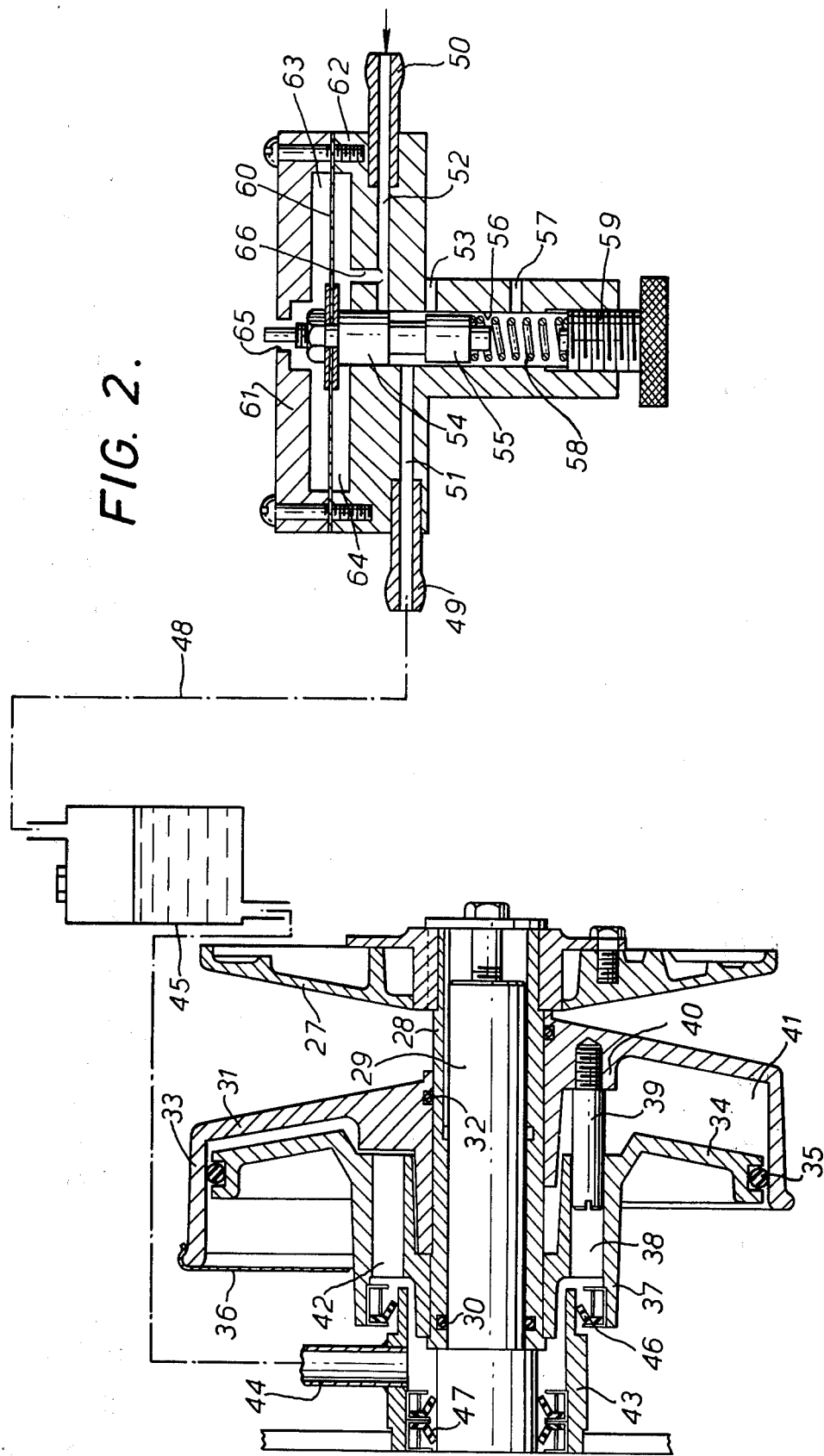

Two embodiments of the invention will be described by way of example, with reference to the accompanying drawings in which:

FIG. 1 is a vertical section through one form of pulley in accordance with the invention; and FIG. 2 is a vertical section through another form of pulley in accordance with the invention, having a breather passage to an oil reservoir.

Referring to FIG. 1, a variable effective diameter pulley adapted to drive a second pulley (not shown) through a V-belt (not shown), has a flange 1 which is secured upon a sleeve 2 through the intermediary of a steel insert 3 keyed to the sleeve and prevented from moving axially thereon by a thrust washer 4. The sleeve 2 and insert 3 are retained upon a prime-mover-driven shaft 5 by a washer 6 apertured at 7 for the passage, with clearance, of a securing bolt 10 and having a portion 9 of reduced diameter which enters the end of the shaft. The outer face of the washer 6 is formed with a groove 8 which intersects the aperture 7 to permit the interior of the shaft 5 to communicate with atmosphere, and a tab washer 11, interposed between the head of the bolt 10 and the outer face of the washer 6, embraces the outer end of a hub portion 12 of the flange 1. A second flange 13 is slidably mounted on the sleeve 2 with the interposition of O-rings 14 and 15 and defines with the flange 1, a variable outwardly divergent gap for the receipton of the V-belt. The flange 13 is formed with a turned-back rim 16 at its periphery, which makes continuous fluid-tight contact with the turned-in rim 17 of an annular back-place 18 through the medium of an O-ring 19 and a rubber dust seal 20. The back-plate 18 is secured at its centre to the end of the sleeve 2 remote from the flange 1 and is provided with driving pins 21 which project forward therefrom and enter recesses formed in a rearwardly extending hub portion 22 of the flange 13. The space between the flange 13 and the back-plate 18 constitutes an annular fluid-tight chamber 23 which can be partly filled with oil through inlets 24 provided in the back-plate and closed by plugs 25. The interior of the shaft 5 is connected to the chamber 23 through small breather aperturs 26 extending through the sleeve 2 and the shaft wall and completing a breather passage extending from the chamber to atmosphere through the shaft 5, aperture 7 and groove 8.

When the shaft 5 is stationary the flange 13 is in its fully retracted position shown in FIG. 1 and the effective diameter of the pulley is at its smallest with the belt at its innermost or low ratio position. When the shaft 5 is driven by a prime-mover (not shown) it rotates the flange 1 through the sleeve 2 and insert 3 and the flange 13 through the back-plate 18 and the driving pins 21. The belt is thus driven through engagement with the flanges 1 and 13 at a speed not substantially greater than that of the shaft 5. As the speed at which the shaft 5 is driven increases the fluid in the chamber 23 moves outwards under the influence of centrifugal force and exerts pressure on the flange 13 to shift it towards the flange 1. As the gap between the flanges decreases the belt is squeezed outwards, gradually increasing the effective diameter of the pulley and thus the speed of the belt relative to that of the shaft 5 until the belt reaches a predetermined outermost position. As the fluid moves towards the outer part of the chamber 23 it is replaced by air entering through the breather passage and leaving again when the speed at which the shaft is driven is reduced and fluid begins to return to the inner part of the chamber 23 permitting the flange 13 to retract.

Employing oil as the operating fluid obviates the need to provide separate means of lubricating the element.

The variable effective diameter pulley shown in FIG. 2 is also adapted to drive a second pulley through a V-belt, and like the pulley shown in FIG. 1, has a flange 27 secured to a sleeve 28 surrounding and fixed to the reduced end portion of a prime-mover-driven shaft 29, with the interposition of an O-ring 30, and a flange 31 slidably mounted, with the interposition of an O-ring 32, on the sleeve and spaced from the flange 27 to provide an outwardly divergent gap between the flanges for the reception of the V-belt. The flange 31 is formed with a turned-back rim 33 which makes continuous fluid-tight contact with the outer periphery of an annular back-plate 34 through the medium of an O-ring 35 and is closed off at the rear by a dust shield 36. The back-plate 34 is formed with a hub 37 which is secured to the end of the sleeve 28 remote from the flange 27 and is formed with bores 38 for the reception of driving pins 39 which are secured into and project rearwardly from a hub portion 40 of the flange 31. The space between the flange 31 and the back-plate 34 constitutes an annular chamber 41 which communicates, through bores 42 in the hub 37, with the interior of an extension sleeve 43 surrounding the larger diameter portion of the shaft 29 and connected through a pipe 44 to an oil tank 45. An oil seal 46 is interposed between the extension sleeve 43 and the hub 37 of the back-plate 34 and another oil seal 47 is interposed between the extension sleeve and the outer surface of the shaft 29.

When the shaft 29 is stationary the flange 31 is in its fully retracted position shown in the upper half of the pulley of FIG. 2 and the effective diameter of the pulley is at its smallest with the belt at its innermost or low ratio position. When the shaft 29 is driven by a prime mover it rotates the flange 27 through the sleeve 28 and the flange 31 through the back-plate 34 and the driving pins 39. The belt is thus driven through engagement with the flanges 27 and 31 at a speed not substantially greater than that of the shaft 29. As the speed at which the shaft 29 is driven increases the oil supplied to the chamber 41 from the tank 45 moves outwards under the influence of centrifugal force and exerts pressure on the flange 31 to shift it towards the flange 27 as described with reference to FIG. 1. As the oil moves towards the outer part of the chamber 41 it is replaced by more oil from the tank 45 and the oil returns to the tank when the speed at which the shaft 29 is driven is reduced.

To provide a greater degree of control of the supply of oil to and exhaustion of oil from the chamber 41, the space above the oil in the tank 45 may, as shown in FIG. 2, be connected to the manifold of an engine (not shown) driving the shaft 29, through a control valve connected at 49 to a line 48 from the tank and at 50 to a line from the manifold. A passage 51 from the connection 49 opens into a central bore, into which also opens a passage 52 from connection 50 and passages 53 and 57 connected to atmosphere. Communication between the passage 51 and the passages 52 and 53 is controlled by lands 54 and 55 on a valve spool slidably mounted within the central bore and having one end engaged by a spring 58, the loading of which is adjustable by a threaded plug 59, and the other end secured to the centre of a diaphragm 60 clamped at its periphery between sections 61 and 62 of the valve casing. The diaphragm 60 divides the upper part of the valve casing into two chambers 63 and 64, of which the former is in constant communication with atmosphere through an aperture 65 and the latter is in constant communication with the passage 52 through a passage 66.

By using this valve it is thus possible to control the pressure on the oil in the tank 45 in accordance with the pressure in the engine manifold and sudden opening of the throttle at lower and medium engine speeds produces partial exhaustion of oil from the chamber 41 and a consequent decrease in the effective diameter of the pulley. When the pulley is employed as part of the automatic transmission of a motor vehicle such a decrease in effective diameter puts the vehicle into a lower gear and enables it to accelerate rapidly.

I claim:

1. A pulley comprising a shaft operatively connected to driving means for rotating said shaft about its axis, a pulley having two flanges one of which is fixed to said shaft and the other of which is slidably mounted on said shaft, and a back-plate fixed to said shaft and defining, with said movable flange, an annular chamber permanently connected to an external source of fluid said annular chamber containing a quantity of oil which acts on said movable flange in response to centrifugal force created by rotation of the shaft, to shift said movable flange towards said fixed flange, wherein said external source of fluid is a tank containing oil whereby a space above the oil in the tank is connected by a control valve to the intake manifold of an engine.

2. A pulley according to claim 1, wherein said control valve comprises a valve member controlling the connection between said tank and intake manifold and operable by a diaphragm sensitive to the pressure in said intake manifold.

3. A pulley according to claim 1, having its fixed flange secured to a sleeve surrounding and fixed to said shaft and its movable flange slidably mounted in fluid-tight manner on said sleeve and spaced from the fixed flange to provide an outwardly divergent gap between them for the reception of a V-belt.

4. A pulley according to claim 1, wherein said back-plate is secured at its centre on said shaft and is provided with driving pins which project into recesses formed in a hub portion of the movable flange.

5. A pulley comprising a hollow shaft operatively connected to driving means for rotating said shaft about its axis, said pulley having two flanges one of which is fixed to said shaft and the other of which is slidably mounted on said shaft, and a back-plate fixed to said shaft and defining with said movable flange, an annular chamber containing a quanity of oil which acts on said movable flange in response to centrifugal force created by rotation of said shaft, to shift said movable flange towards said fixed flange, said back-plate having at least one drive pin which project therefrom and into a recess formed in a hub portion of said movable flange, a breather passage connecting said annular chamber with ambient atmosphere, said breather passage extending from said annular chamber into said hollow shaft and said annular chamber also having a plugable inlet provided in said back-plate for facilitating the filling of said annular chamber with oil.

6. A pulley according to claim 5, wherein the movable flange is formed with a turned-back rim which makes continuous fluid-tight contact with the outer periphery of said back-plate.

* * * * *